(12) United States Patent
Zhang et al.

(10) Patent No.: US 12,227,317 B2
(45) Date of Patent: *Feb. 18, 2025

(54) SYSTEMS AND METHODS FOR A SPRING-AUGMENTED QUADROTOR FOR INTERACTIONS WITH CONSTRAINED ENVIRONMENTS

(71) Applicants: Wenlong Zhang, Chandler, AZ (US); Seyed Mostafa Rezayat Sorkhabadi, Tempe, AZ (US); Shatadal Mishra, Tempe, AZ (US); Karishma Patnaik, Tempe, AZ (US)

(72) Inventors: Wenlong Zhang, Chandler, AZ (US); Seyed Mostafa Rezayat Sorkhabadi, Tempe, AZ (US); Shatadal Mishra, Tempe, AZ (US); Karishma Patnaik, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,654

(22) Filed: Sep. 1, 2023

(65) Prior Publication Data
US 2024/0002075 A1 Jan. 4, 2024

Related U.S. Application Data

(63) Continuation of application No. 17/500,720, filed on Oct. 13, 2021, now Pat. No. 11,787,574.

(60) Provisional application No. 63/091,114, filed on Oct. 13, 2020.

(51) Int. Cl.
| | | |
|---|---|---|
| B64U 10/14 | (2023.01) | |
| B64U 20/40 | (2023.01) | |
| B64U 20/65 | (2023.01) | |
| B64U 30/293 | (2023.01) | |
| B64U 30/296 | (2023.01) | |
| B64U 30/299 | (2023.01) | |

(52) U.S. Cl.
CPC .......... *B64U 10/14* (2023.01); *B64U 30/293* (2023.01); *B64U 20/40* (2023.01); *B64U 20/65* (2023.01); *B64U 30/296* (2023.01); *B64U 30/299* (2023.01); *B64U 2201/10* (2023.01)

(58) Field of Classification Search
CPC .. B64C 3/56; B64C 1/30; B64C 1/063; B64C 2211/00; B64U 30/20; B64U 30/293; B64U 30/296; B64U 30/299; B64U 20/50; B64U 10/13; B64U 10/14
See application file for complete search history.

(56) References Cited

U.S. PATENT DOCUMENTS 10,549,850 B1 * 2/2020 Ryan .................... B64U 30/294

FOREIGN PATENT DOCUMENTS

| CN | 107380441 A | * 11/2017 |
|---|---|---|
| CN | 111924088 A | * 11/2020 |

* cited by examiner

*Primary Examiner* — Richard Green
*Assistant Examiner* — Arfan Y. Sinaki
(74) *Attorney, Agent, or Firm* — Polsinelli PC

(57) ABSTRACT

Various embodiments of a variable geometry quadrotor with a compliant frame are disclosed, which adapts to tight spaces and obstacles by way of passive rotation of its arms.

20 Claims, 15 Drawing Sheets

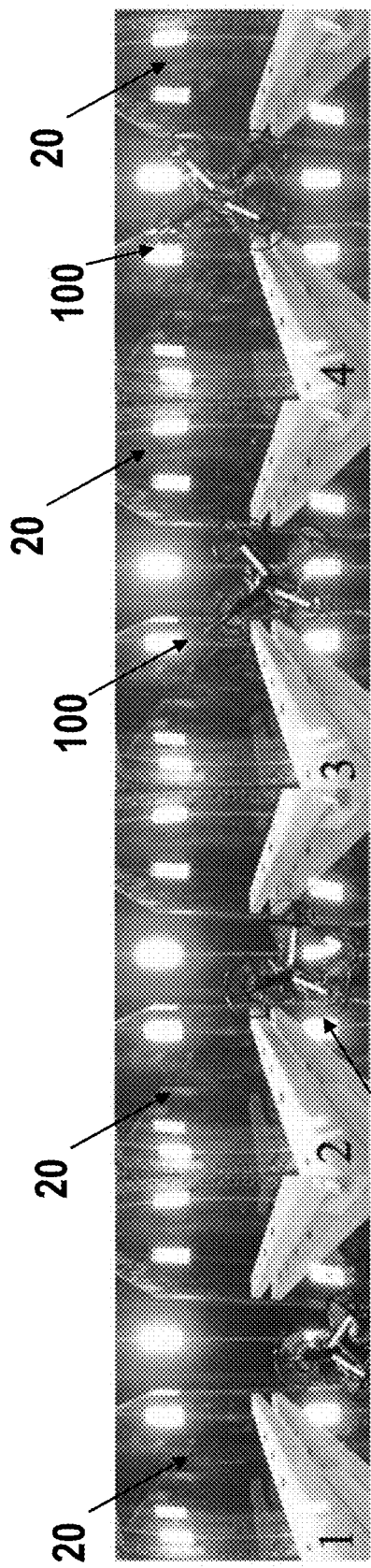

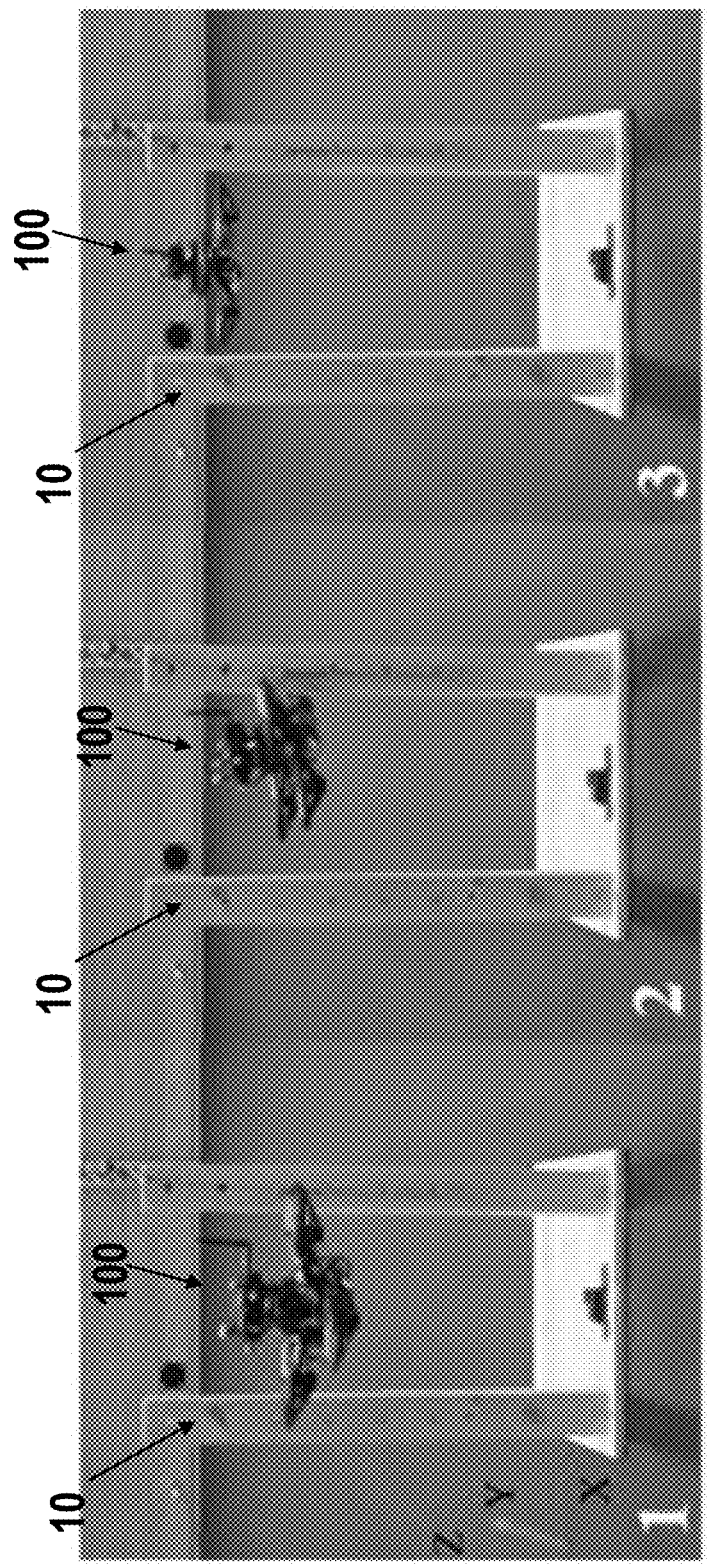

US 12,227,317 B2

SYSTEMS AND METHODS FOR A SPRING-AUGMENTED QUADROTOR FOR INTERACTIONS WITH CONSTRAINED ENVIRONMENTS

CROSS REFERENCE TO RELATED APPLICATIONS

The present document is a continuation application that claims benefit to U.S. patent application Ser. No. 17/500,720 filed Oct. 13, 2021 which application claims the benefit of U.S. Provisional Patent Application Ser. No. 63/091,114 filed on Oct. 13, 2020, which are herein incorporated by reference in their entireties.

FIELD

The present disclosure generally relates to quadcopter systems; and in particular, to a quadrotor with variable geometry and associated control model to accommodate improved navigation through constrained spaces.

BACKGROUND

Recent work on quadrotor systems demonstrated their applications for challenging tasks such as inspections of cluttered and occluded environments, aerial grasping and contact-based navigation, where a quadrotor interacts physically with the environment while navigating through it. Flying through such cluttered environments often requires the quadrotor to traverse through gaps smaller than its size, while simultaneously ensuring successful missions.

For a rigid quadrotor, flying through constrained spaces leads to research topics such as executing aggressive maneuvers or performing real-time trajectory re-planning to avoid cluttered areas using computer vision techniques. Alternatively, a quadrotor can have an adaptive morphology, where a folding mechanism helps the quadrotor fly through narrow apertures. In previous designs, additional actuators were needed to control the adaptive morphology, which increases the total weight of the system and decreases its power-to-weight ratio. In either case, different interactions bring significant challenges for vehicle stability when the quadrotor experiences unknown interactions with edges formed by passageways and gaps that the quadrotor may fly through.

It is with these observations in mind, among others, that various aspects of the present disclosure were conceived and developed.

BRIEF DESCRIPTION OF THE DRAWINGS

FIGS. 8A-8D are sequential photographs showing the quadrotor system of FIG. 1 flying through a narrow passageway;

FIGS. 9A-9C are sequential photographs showing the quadrotor system of FIG. 1 flying through a gap between objects;

Corresponding reference characters indicate corresponding elements among the view of the drawings. The headings used in the figures do not limit the scope of the claims.

DETAILED DESCRIPTION

Figure 1:
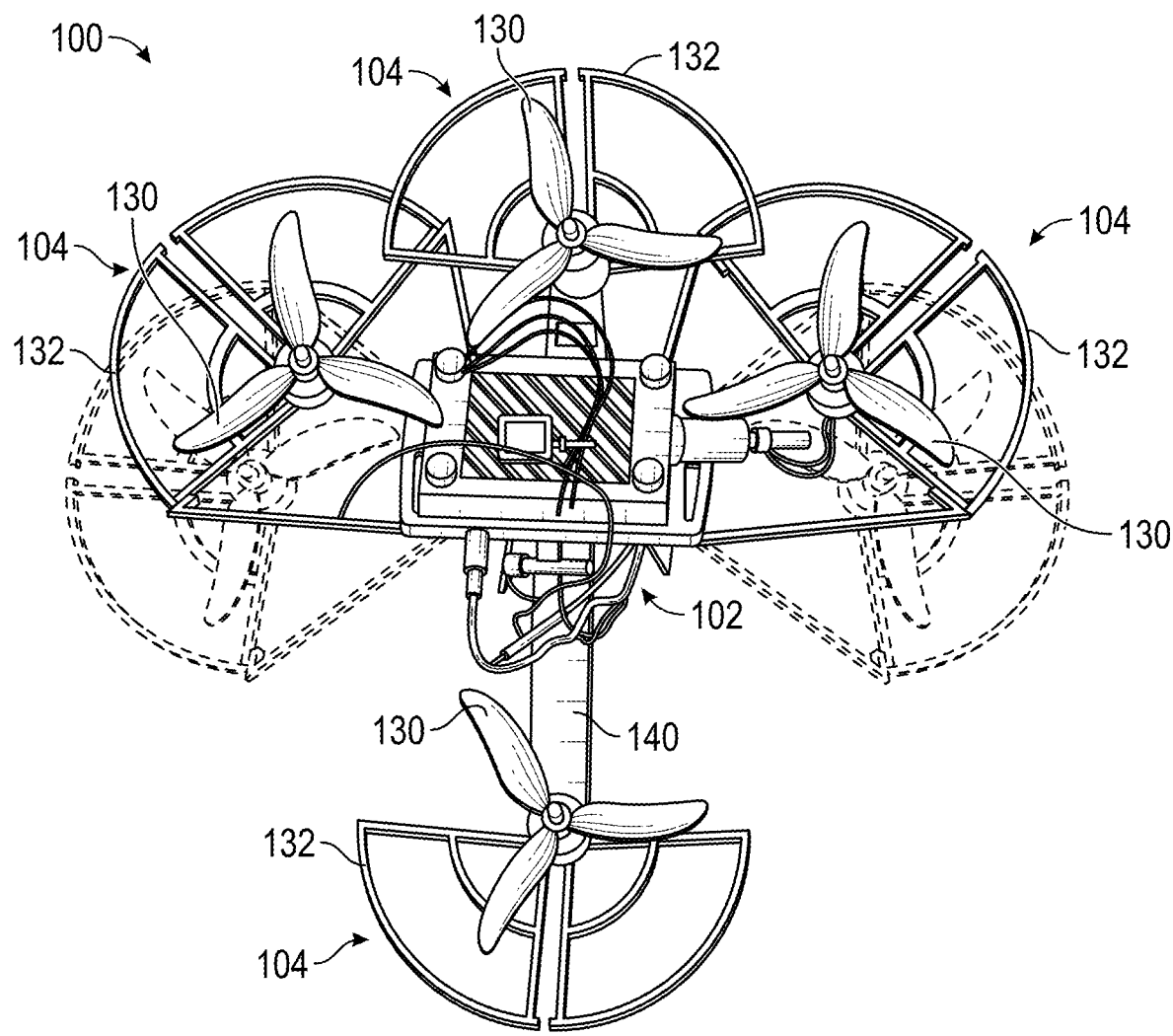
FIG. 1 is a top view of a spring-augmented quadrotor system illustrating a passive adaptive morphology.

Various embodiments of a novel quadrotor with variable geometry suitable which allows the quadrotor to physically interact with cluttered environments and fly through narrow gaps and passageways are disclosed herein. The compliant and variable geometry quadrotor with passive morphing capabilities disclosed is designed may include torsional springs at every arm hinge to allow for rotation driven by external forces. In one embodiment, the quadrotor includes a dynamic model for control of the quadrotor as well as an adaptive controller for trajectory tracking as further described herein. A corresponding Lyapunov stability proof of attitude tracking is also presented. Further, an admittance controller is designed to account for changes in yaw due to physical interactions with the environment. Finally, the disclosed design for the quadrotor has been validated in flight tests with two setups: a small gap and a passageway. The experimental results have demonstrated the unique capability of the quadrotor in navigating through constrained narrow spaces. Referring to the drawings, an embodiment of a quadrotor is illustrated and generally indicated as 100 in FIGS. 1-11.

Figure 2A:
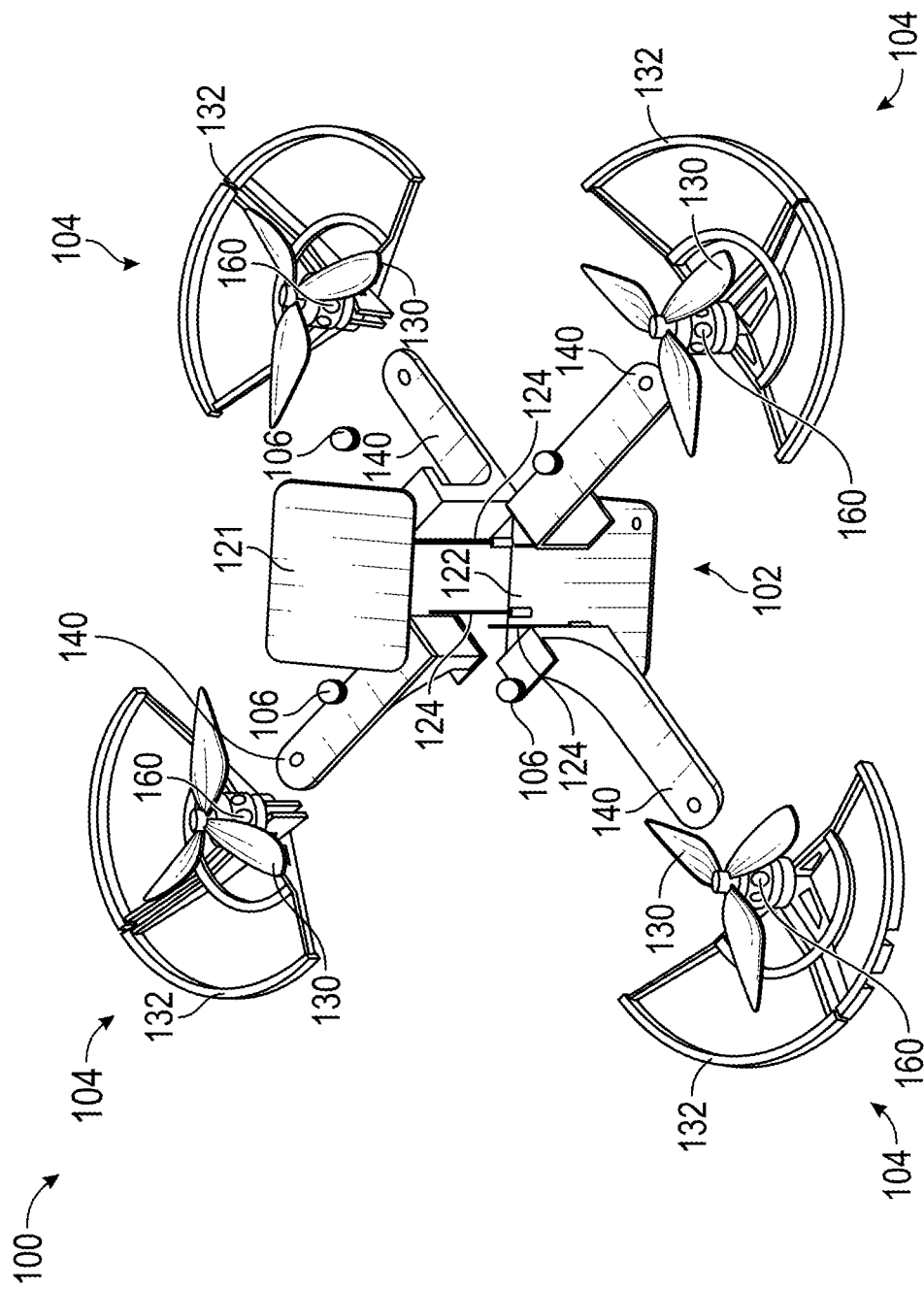
FIG. 2A is an exploded view showing the quadrotor system of FIG. 1.
Figure 2B:
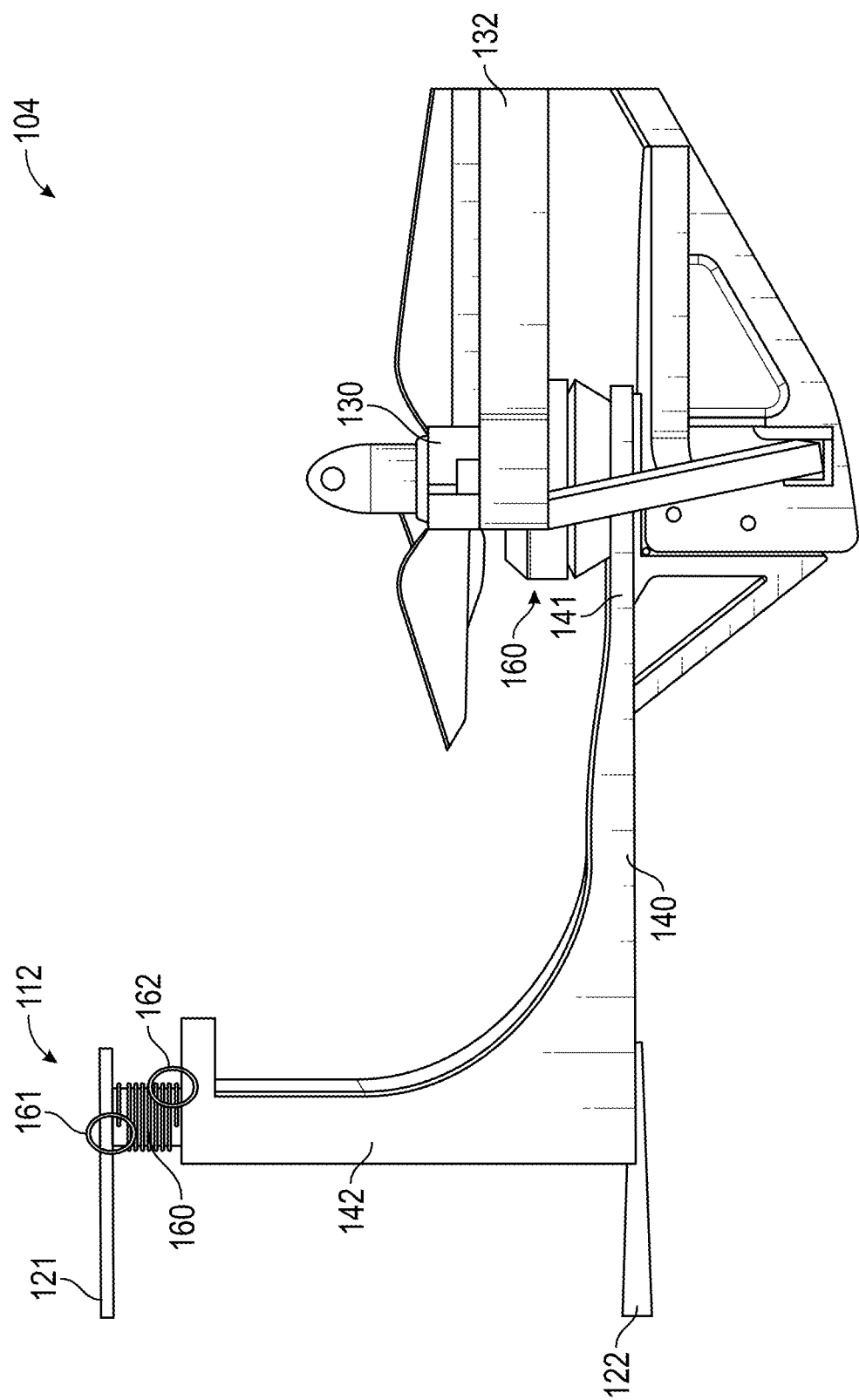
FIG. 2B is a close-up view showing a torsional spring mechanism of an arm of the quadrotor system of FIG. 1.

Referring to FIG. 1 and FIGS. 2A-2B, a quadrotor 100 as disclosed herein can interact with its environment and modify its configuration in response to external forces imposed by the environment. In general, the quadrotor includes a body frame 102 and plurality of arms 104 extending therefrom. In particular, the body frame 102 includes a base 122 and a top plate 121, and a portion of each of the plurality of arms 104 extends from a position between the base 122 and top plate 121 as shown.

Each of the plurality of arms 104 includes a propeller (130) driven by at least one motor (160), and a propeller guard 132 protecting the propeller (130) from objects within the environment. A portion of each arm 104 is mounted over a connection member 124 defining a hinge or joint 112 extending between the base 122 and the top plate 121 accommodating in-plane rotary motion of the arm 104 along a plane defined by the hinge (rotary motion indicated and further described in FIGS. 3A-3B and 4A-4B). In other words, when in contact with an obstruction, the arms 104 rotate about the hinge defined by the connection member 124.

In addition, a torsional spring (106) is attached along and/or to each hinge. The torsional spring (106) deflects to accommodate the in-plane rotary motion of the arm 104 away from an original position as the arm engages an obstruction and provides an angular return force to urge the arm 104 back to the original position. FIG. 1 shows the quadrotor 100 in spring-loaded and unloaded configurations (unloaded configuration shown in phantom). When in contact with an obstruction, propeller guards 132 located at an end of each of the plurality of arms 104 of the quadrotor 100 contact the obstruction and act as bumpers, also forcing the associated arm 104 to rotate about its respective joint 112; this mechanical compliance results in passive morphing and is critical for vehicle stability of the quadrotor 100 during physical interactions with the environment. As such, the quadrotor 100 defines a compliant vehicle frame which adapts to tight spaces by physically interacting with the space.

Compared to prior work on morphing quadrotors, the quadrotor 100 employing the torsional springs 106 as described results in negligible weight (<2% of the total weight) for achieving adaptive morphology. Hence, the power-to-weight ratio of the quadrotor 100 is not significantly affected. In addition, as indicated, the rotary motion of the arms 104 is passive and actuators are not required.

The rest of this disclosure discusses the details of the quadrotor 100 and its fabrication followed by a description of a model and system dynamics for varying geometry of the quadrotor 100. In addition, the present disclosure discusses an adaptive controller 210 (low-level controller, FIG. 7) for trajectory tracking and an admittance controller 260 (FIG. 7) for flight through passageways as well as providing experimental results to validate the quadcopter 100 for various testing scenarios.

Quadrotor Design

In some embodiments, the body frame 102 and propeller guards 132 of the quadrotor 100 are 3D printed using a polymer such as polylactide or another suitable material, to ensure that the quadrotor 100 is lightweight and resilient to impact forces experienced during interactions with the environment. In some embodiments, the quadrotor 100 includes a base 122 and a top plate 121 operatively coupled to four arms 104. Each arm 104 of the quadrotor 100 includes an arm member 140 associated with a respective torsional spring 106 and a propeller guard 131. The torsional springs 106 are each attached to a respective joint 112 that connects a respective arm member 140 to the top plate 121. As shown, each torsional spring 106 defines a first end 161 and a second end 162, wherein the first end 161 being secured to the top plate 121 and the second end 162 being secured to the arm member 140 and/or a connection member 124, such as a screw. This assembled engagement between these components adds a rotational degree of freedom (DoF) about the connection member 124 located within each joint (FIG. 2A) to each arm 104, thereby giving each arm 104 the ability to passively fold when in-plane external forces are exerted on the quadrotor 100. This passive variable geometry design enables the quadrotor 100 to fly through narrow gaps and passageways by physically interacting with the environment and allowing obstacles to rotate the arms 104 away from a standard position and still maintain control. Propeller guards 132 are attached to an outer portion 141 of each of the arm members 140 and are designed to ensure smooth transitions during such flights. The arms 104 are designed in such a way that adjacent motors 160 and propellers 130 associated with each arm 104 are staggered at different heights, thus preventing physical interference between the arms 104 when folding occurs. In some embodiments, the torsional spring 106 is lightweight (4 g), capable of sufficient deflection (120°), and compliant enough (0.21 N m/rad) so that the arms 104 can be folded without requiring the quadrotor 100 to provide large thrust force when moving forward through narrow spaces. One embodiment of the quadrotor 100 shown has a total width of 41 cm and a folded width of 28 cm. The total width of the quadrotor may be in the range of about 30-100 cm and the folded width may be in the range of about 20-70 cm.

Model and System Dynamics

Figure 7:
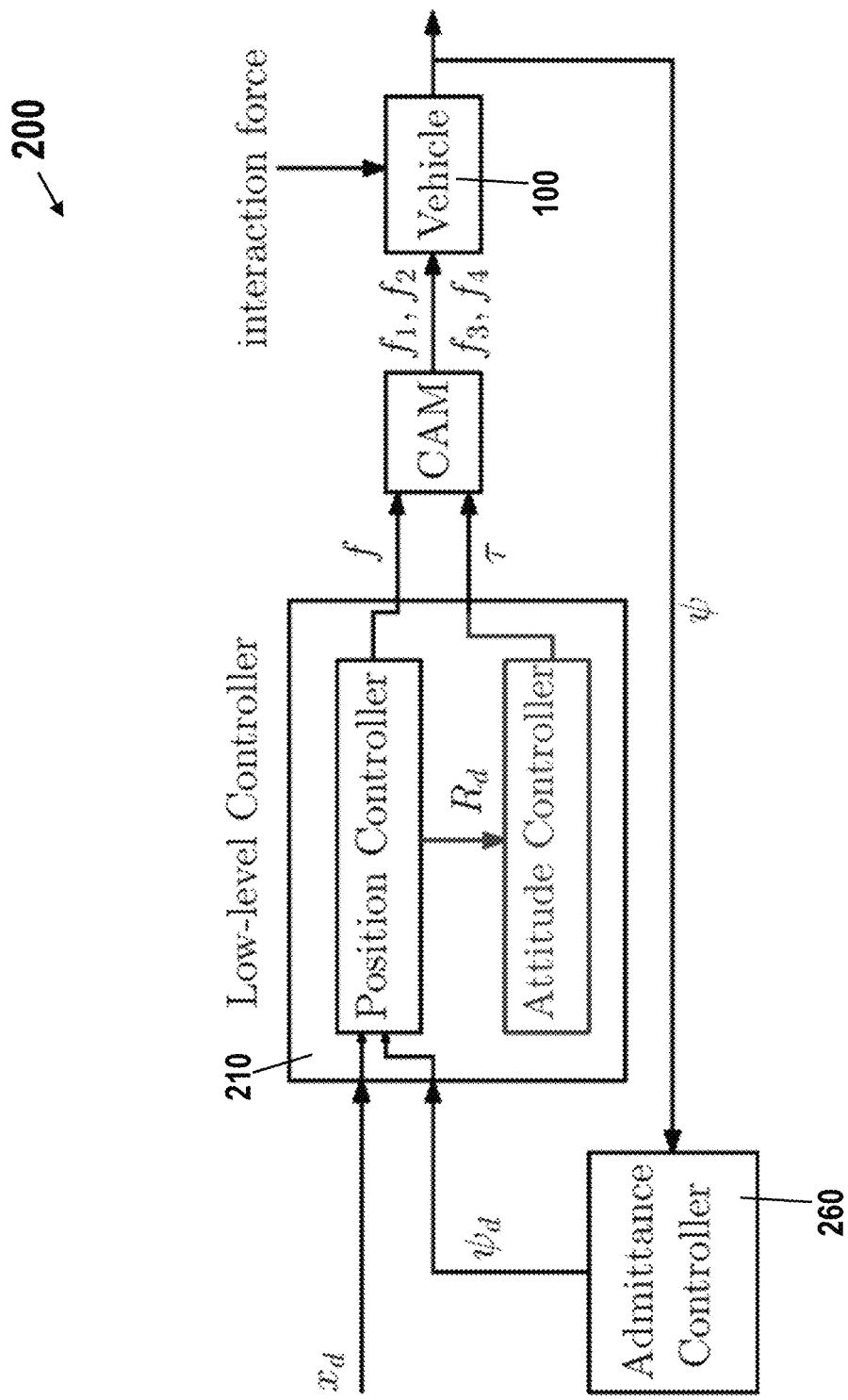
FIG. 7 is a block diagram showing a controller of the quadrotor system of FIG. 1.

The notations used in this disclosure will be described in greater detail as well as the details of a simplified lumped mass model to calculate a position of center of gravity (CG) of the quadrotor 100 and a moment of inertia matrix of the quadrotor 100 at any instant in time. For an asymmetric and varying CG, the mapping of control inputs to individual motor thrusts changes, so a derivation of a control allocation matrix is further described herein. As shown in FIG. 7, the quadrotor 100 includes a computing system 200 for control of components of the quadrotor 100 in which the computing system 200 implements a low-level controller 210 and an admittance controller 260.

Notation

Figures 3A, 3B:
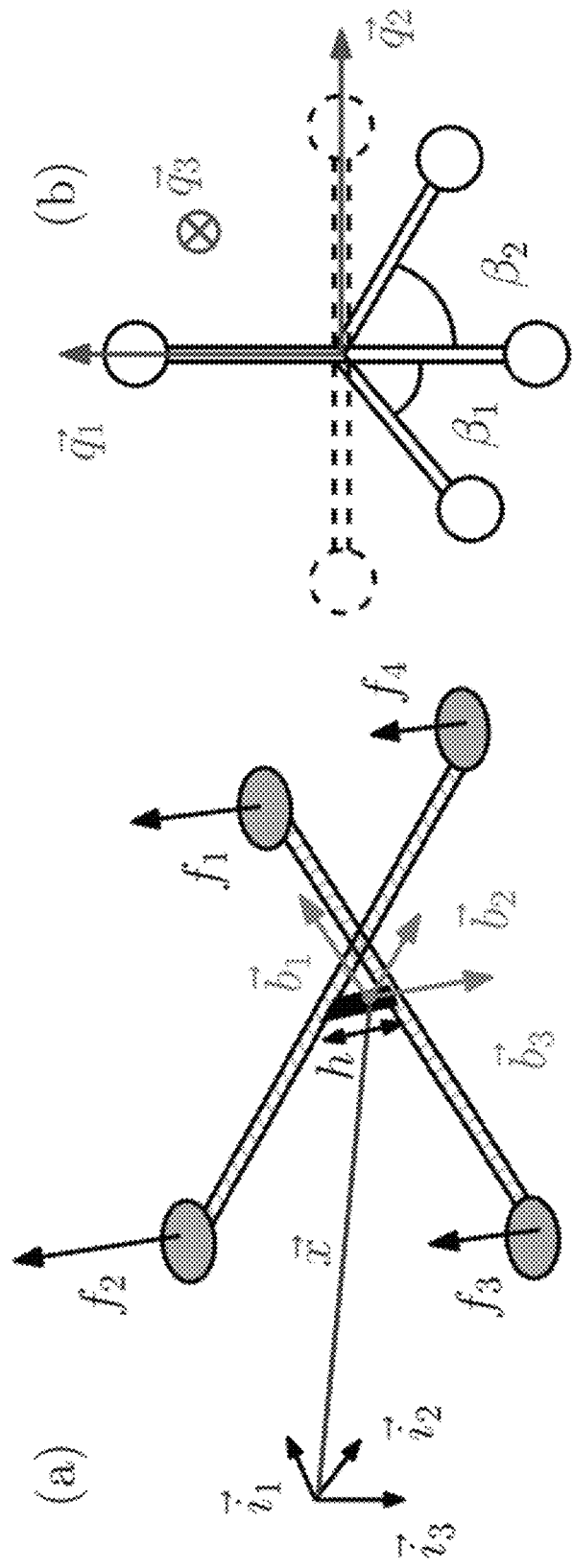
FIG. 3A is a diagram showing a coordinate system for dynamic modeling of the quadrotor system of FIG. 1.
FIG. 3B is a diagram showing passive folding with respect to the coordinate system of FIG. 3A.
Figures 4A, 4B:
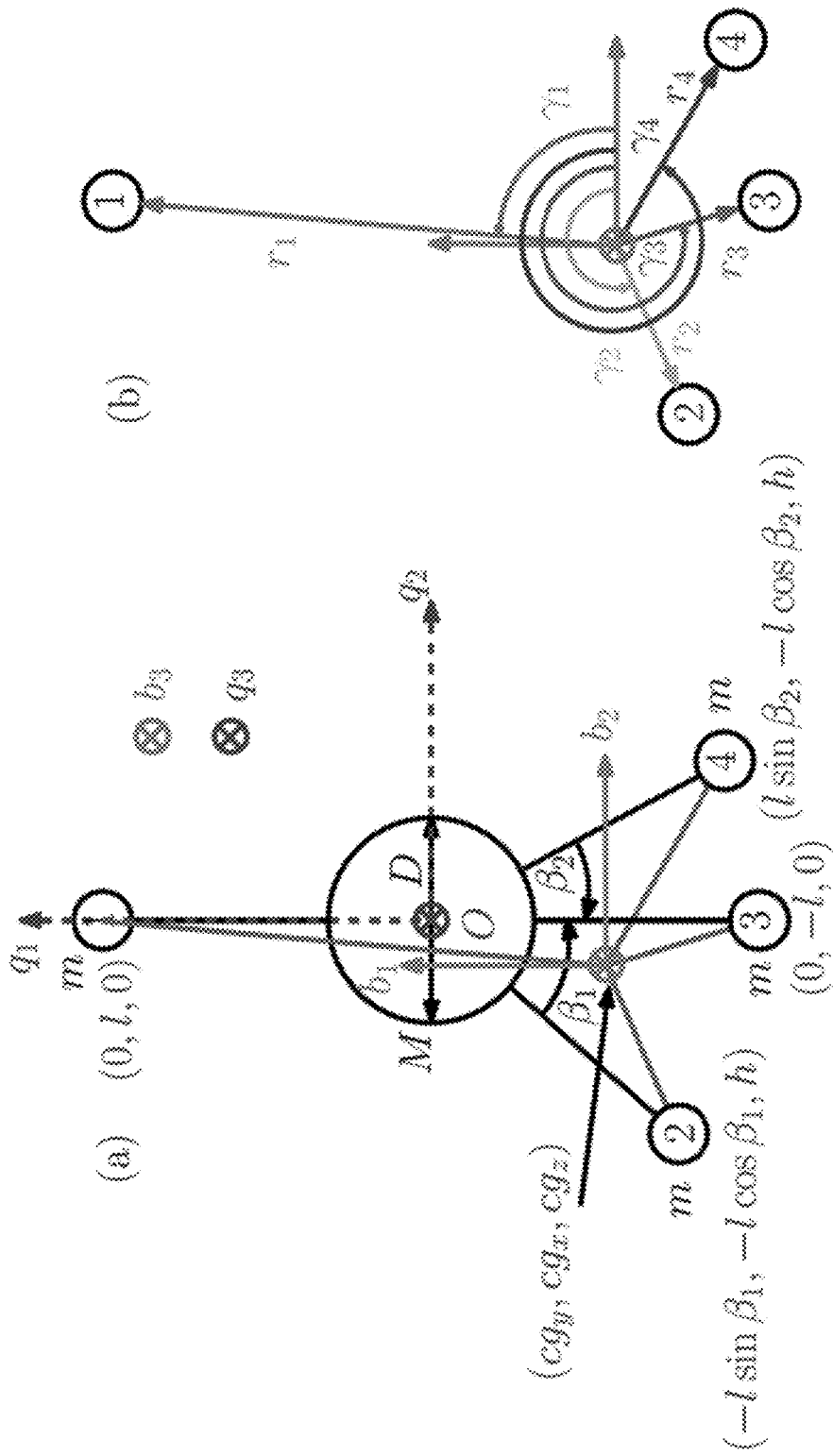
FIG. 4A is a diagram showing a moment of inertia model for the quadrotor system of FIG. 1.
FIG. 4B is a diagram showing a moment of inertia model for the quadrotor system of FIG. 1.
Figure 5A:
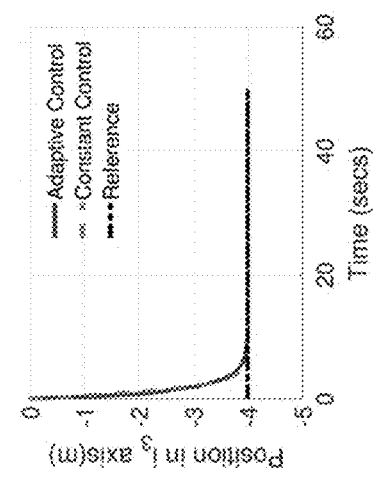
FIGS. 5A-5F are graphical representations showing trajectory tracking performance of a standard non-adaptive controller vs the adaptive controller of the quadrotor system of FIG. 1.
Figure 5B:
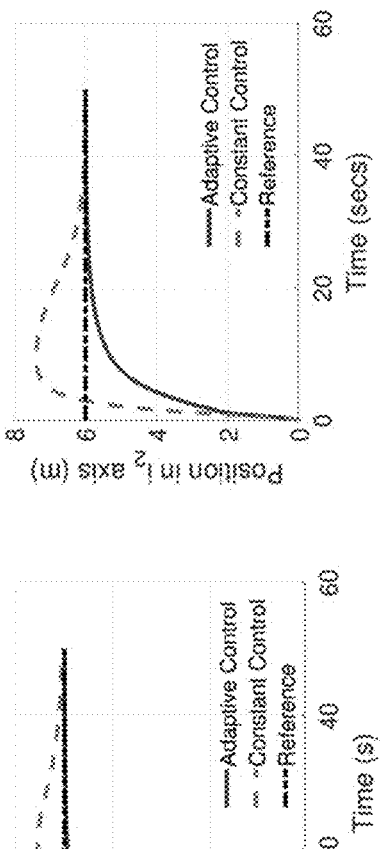
Figure 5C:
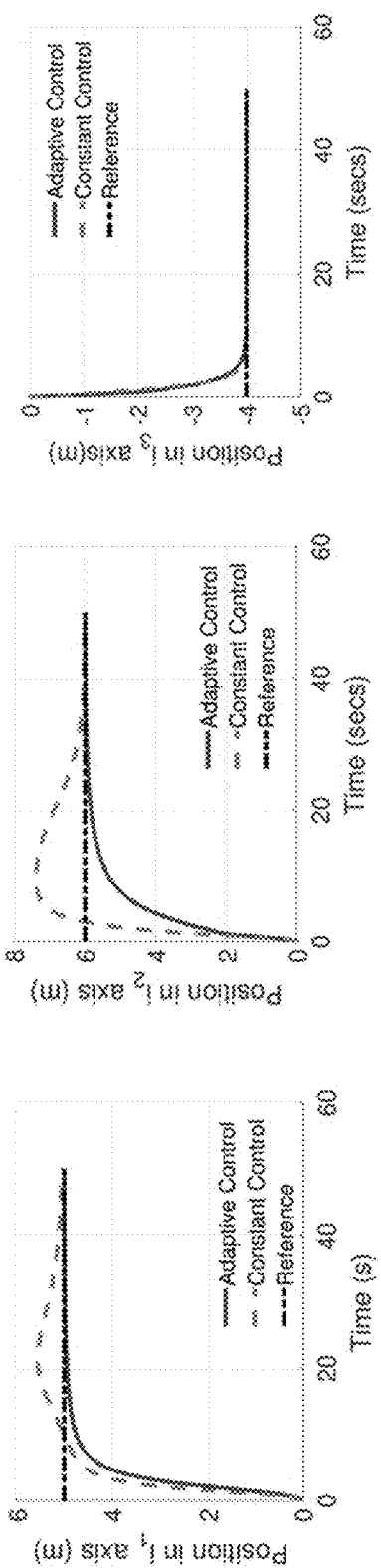
Figure 5D:
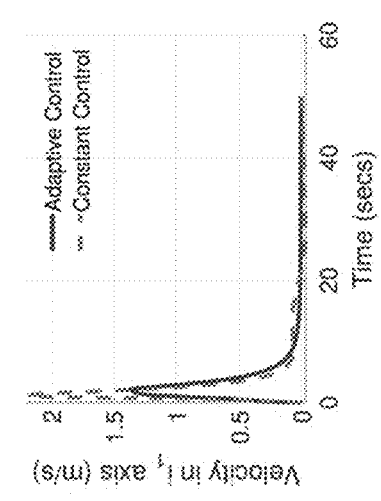
Figure 5E:
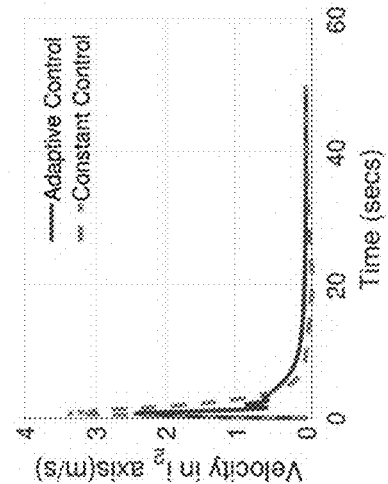
Figure 5F:
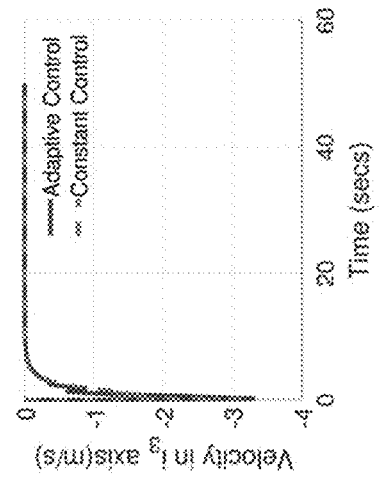

For system dynamics and modeling, an inertial frame $\{i_1, i_2, i_3\}$ and a body frame $\{b_1, b_2, b_3\}$ are defined as shown in FIGS. 3A and 3B. The origin of this body fixed frame is located at the CG of the quadrotor 100. A $\{q_1, q_2, q_3\}$ frame is also defined with its origin at the geometric center of the top view of the frame in order to calculate the relative position of the varying CG with respect to it. The $q_1$ axis is parallel to the line connecting motors 1 and 3 when the corresponding arms are in their equilibrium positions. Similarly, the $q_2$ axis is defined perpendicular to $q_1$ and lies in $b_1$-$b_2$ plane, as shown in FIGS. 4A and 4B. The $q_3$ axis is perpendicular to the $q_1$-$q_2$ plane and is along the $b_3$ axis. Table I lists the notations, and $(\cdot)_d$ is used to denote the desired quantity of $(\cdot)$ in this disclosure.

TABLE 1

| | |
|---|---|
| $m \in \mathbb{R}$ | point mass representing each pair of motor, propeller, and corresponding arm model |
| $M \in \mathbb{R}$ | mass of the center piece |
| $m_t \in \mathbb{R}$ | total mass of the entire system |
| $x \in \mathbb{R}^3$ | position of the vehicle in the inertial frame |
| $v \in \mathbb{R}^3$ | velocity of the vehicle in the inertial frame |
| $J \in \mathbb{R}^{3 \times 3}$ | moment of inertia matrix in the body fixed frame |
| $\Omega \in \mathbb{R}^3$ | angular velocity in the body frame |
| $R \in SO(3)$ | rotation matrix from body frame to the inertial frame |
| $cg \in \mathbb{R}^3$ | position of center of gravity of vehicle in the $\{q_1, q_2, q_3\}$ frame |
| $\beta_1, \beta_2 \in S^1$ | angles made by arms 2 and 4 respectively with the negative $q_1$ axis |
| $f \in \mathbb{R}$ | control input of total thrust |

TABLE 1-continued

| | |
|---|---|
| $\tau \in \mathbb{R}^3$ | control moments for roll, pitch and yaw |
| $\gamma \in \mathbb{R}^4$ | angles made by each arm with $q_2$ axis |
| $r \in \mathbb{R}^4$ | distance from each m to the CG |
| $h \in \mathbb{R}$ | height of motor pairs 2 and 4 in $q_3$ |
| $k_\tau \in \mathbb{R}$ | spring constant |

Expression for Moment of Inertia

Because the quadrotor 100 has a varying geometry while flying through passageways, it is necessary to compute the location of CG at any instant of time and the system's moment of inertia in order to compute correct control moments for trajectory tracking. The quadrotor 100 is modeled as an assemblage of a large sphere of mass M with diameter D and point masses of m units at a distance of I each from the center of the sphere. In addition, spheres 2 and 4 are at a height of h units below the motor pairs of 1 and 3. The inertia tensor of the whole body is calculated considering the $\{q_1, q_2, q_3\}$ frame with origin O as shown in FIGS. 4A and 4B.

Without loss of generality, let arms 2 and 4 make an angle of $\beta_1$ and $\beta_2$ with the negative $q_1$ axis respectively as shown in FIGS. 4A and 4B. The coordinates for CG in $\{q_2, q_1, q_3\}$ denoted by $(cg_y, cg_x, Cg_z)$ as functions of $\beta_1$ and $\beta_2$ are given by:

$$cg = (-Cl(\sin \beta_1 - \sin \beta_2), -Cl(\cos \beta_1 + \cos \beta_2), 2Ch), \quad (1)$$

where $$C = \left(\frac{m}{M+4m}\right).$$

Let $J_{xx}, J_{yy}, J_{zz}$ denote the moment of inertia about the $b_1, b_2, b_3$ axis, respectively, then the time-varying moment of inertia of the system, $J(\beta_1(t), \beta_2(t))$, can be written as:

$$J(\beta_1(t), \beta_2(t)) = \begin{bmatrix} J_{xx} & J_{xy} & J_{xz} \\ J_{yx} & J_{yy} & J_{yz} \\ J_{zx} & J_{zy} & J_{zz} \end{bmatrix}, \quad (2)$$

and the formulation of each term is described in Table II.

TABLE II

Moment of inertia calculation from angles $\beta_1, \beta_2$ (in kg – m$^2$)

| | |
|---|---|
| $J_{xx}$ | $\tfrac{2}{5} MR^2 + M(cg_y^2 + cg_z^2) + 2m(cg_y^2 + cg_z^2) +$ <br> $m((-l \sin \beta_1 - cg_y)^2 + (h - cg_z)^2) + m((l \sin \beta_2 - cg_y)^2 +$ <br> $(h - cg_z)^2)$ |
| $J_{yy}$ | $\tfrac{2}{5} MR^2 + M(cg_x^2 + cg_z^2) + m((l - cg_x)^2 + cg_x^2) +$ <br> $m((-l - cg_x)^2 + cg_x^2) +$ <br> $m((-l \cos \beta_1 - cg_x)^2 + (h - cg_z)^2)$ <br> $m((-l \cos \beta_2 - cg_x)^2 + (h - cg_z)^2)$ |
| $J_{zz}$ | $\tfrac{2}{5} MR^2 + M(cg_x^2 + cg_y^2) + m(cg_y^2 + (l - cg_x)^2) +$ <br> $m(cg_y^2 + (-l - cg_x)^2) +$ <br> $m((-l \sin \beta_1 - cg_y)^2 + (-l \cos \beta_1 - cg_x)^2) +$ <br> $m((l \sin \beta_2 - cg_y)^2 + (-l \cos \beta_2 - cg_x)^2)$ |
| $J_{xy} = J_{yx}$ | $M cg_y cg_x - mcg_y(-l cg_x) - mcg_y(-l - cg_x) +$ <br> $m(-l \sin \beta_1 - cg_y)(-l \cos \beta_1 - cg_x)$ |
| $J_{yz} = J_{xy}$ | $M cg_y cg_z + 2mcg_y cg_z + m(-l \sin \beta_1 - cg_y)(h - cg_z) +$ <br> $m(l \sin \beta_2 - cg_y)(h - cg_z)$ |
| $J_{zx} = J_{xz}$ | $M cg_x cg_z - m(-l cg_x)cg_z - m(-l - cg_x)cg_z +$ <br> $m(-l \cos \beta_1 - cg_x)(h - cg_z) + m(-l \cos \beta_2 - cg_x)(h - cg_z)$ |

The moment of inertia calculated using (2) is used to design an adaptive controller 210 for trajectory tracking. This formulation is verified using a SolidWorks model as shown in Table III in Appendix A. The parameter values of the lumped mass model for the current design are: M=710 g, m=95 g, D=10 cm, I=12.5 cm, h=−3 cm.

Defining Control Inputs and Control Allocation

Assuming that the thrust produced by each propeller 130 of the quadrotor 100 is directly controlled and that the direction of thrust generated is normal to the quadrotor plane, the total thrust is the sum of thrusts produced by each propeller 130, that is, $f = \sum_{i=1}^{4} f_i$. Further, let $\tau_1, \tau_2$ and $\tau_3$ denote the pitch, roll and yaw moments respectively and $\gamma_i$, i=1, . . . , 4 denote the angles made by each arm 104 with the positive $b_2$ axis as shown in FIG. 4B. The moments can be calculated about $b_1$ and $b_2$ axes as $$\tau_1 = f_1 r_1 \sin \gamma_1 + f_2 r_2 \sin \gamma_2 \quad (3)$$
$$f_3 r_3 \sin \gamma_3 + f_4 r_4 \sin \gamma_4$$
$$\tau_2 = -f_1 r_1 \sin \gamma_1 - f_2 r_2 \sin \gamma_2$$
$$-f_3 r_3 \sin \gamma_3 - f_4 r_4 \sin \gamma_4$$
$$\tau_3 = \sum_{i=1}^{4} (-1)^i c_\tau f_i,$$

where the torque generated by each propeller 130 (FIG. 1) contributes to the total yaw moment and is equal to $(-1)^i c_\tau f_i$ for a fixed constant $c_\tau$. The control allocation matrix (CAM) of the total thrust f and total moment T can be determined as a mapping to individual motor thrusts, $f_1, f_2, f_3$ and $f_4$, as $$\begin{bmatrix} f \\ \tau_1 \\ \tau_2 \\ \tau_3 \end{bmatrix} = \begin{bmatrix} 1 & 1 & 1 & 1 \\ r_1 s \gamma_1 & r_2 s \gamma_2 & r_3 s \gamma_3 & r_4 s \gamma_4 \\ -r_1 c \gamma_1 & -r_2 c \gamma_2 & -r_3 c \gamma_3 & -r_4 c \gamma_4 \\ -C_\tau & c_\tau & -c_\tau & c_\tau \end{bmatrix} \begin{bmatrix} f_1 \\ f_2 \\ f_3 \\ f_4 \end{bmatrix}, \quad (4)$$

The determinant of this matrix is:

$$\det(CAM) = 2c_\tau(r_1 r_2 \sin(\gamma_1 - \gamma_2) +$$
$$r_1 r_4 \sin(\gamma_1 - \gamma_4) + r_2 r_3 \sin(\gamma_3 - \gamma_2) + r_3 r_4 \sin(\gamma_4 - \gamma_3)).$$

It is shown that when arms 104B-104D are at the same location, this matrix is singular, implying that the quadcopter 100 will lose some degrees of freedom for full attitude control and need to find solutions for a reduced order system. For this disclosure, it is ensured that CAM does not become singular at any instant of time.

In the rest of this disclosure, it is assumed that control inputs to the system are total thrust $f \in \mathbb{R}$ and torque $\tau \in \mathbb{R}^3$ and use (4) to calculate the individual thrust needed for each propeller 130.

System Dynamics

The dynamics of the quadrotor 100 about the CG with control inputs f and T are given by:

$$m_t \dot{v} = m_t g e_3 - R e_3,$$

$$\dot{x} = v$$

$$\dot{R} = R \hat{\Omega},$$

$$J \dot{\Omega} = \tau - \Omega \times J \Omega, \quad (5)$$

where g=9.81 ms$^{-2}$ denotes the acceleration due to gravity, e3 denotes the $i_3$ axis unit vector and the hat map $\hat{}$: $\mathbb{R}^3 \to SO(3)$ is a symmetric matrix operator defined by the condition that $\hat{x}y = x \times y$, $\forall x$, $y \in \mathbb{R}^3$.

Controller Design

Referring to FIG. 7, the low-level attitude controller 210 for trajectory tracking and how the design is leveraged with an admittance controller 260 for flying through passageways will be discussed.

Adaptive Attitude Control

For trajectory tracking of a varying morphology, an adaptive attitude controller 210 is disclosed on the nonlinear configuration Lie group which accounts for the quadrotor's 100 varying moment of inertia. The desired $b_{1d}$, $b_{2d}$ and $b_{3d}$ axes are chosen in a similar fashion as that of a standard quadrotor. Now, errors in R and Ω are defined as:

$$e_\Omega = \Omega - R^T R_d \Omega_d,$$

$$e_R = \tfrac{1}{2}(R_d^T R - R^T R_d)^\vee. \tag{6}$$

The control moment $T \in \mathbb{R}^3$ is selected as:

$$\tau = J(-k_R e^R - k_\Omega e_\Omega - k_{d\Omega} \dot{e}_\Omega + \zeta_d) + \Omega \times J\Omega \tag{7}$$

for any positive constants $k_R$, $k_\Omega$, $k_{d\Omega}$ and $\zeta_d = -\hat{\Omega} R^T \dot{R}_d \Omega_d + R^T R_d \dot{\Omega}_d$. It is proven that with this controller 210, the tracking error of attitude dynamics will converge to zero asymptotically. The estimated angular acceleration, $\dot{\Omega}$, can be obtained by numerical differentiation of the estimated angular velocity. As numerical differentiation results in noisy output, the estimated angular acceleration is not utilized for implementation purposes.

Proof: The asymptotic stability for the attitude error is given in the appendix.

Simulations: The comparison results of simulations for a case where $\beta_1 = 30°$, $\beta_2 = 30°$, $x_d = [5\ 5\ -4]^T$ and $b_{1d} = [1\ 0\ 0]^T$ with the adaptive controller 210 and a standard controller which does not account for the varying $J(\beta_1(t), \beta_2(t))$ are shown in FIGS. 5A-5F. It is noticed that for a short distance, the non-adaptive controller does not deviate significantly from the desired trajectory. However, if the morphing is persistent for a longer duration, with a non-adaptive control, there is significant deviation from the desired trajectory, whereas the adaptive controller 210 achieves accurate tracking. This is attributed to the shifted CG and the varying moment of inertia which is not accounted by a non-adaptive controller to generate the appropriate f and T control signals.

Admittance Control

Figure 6:
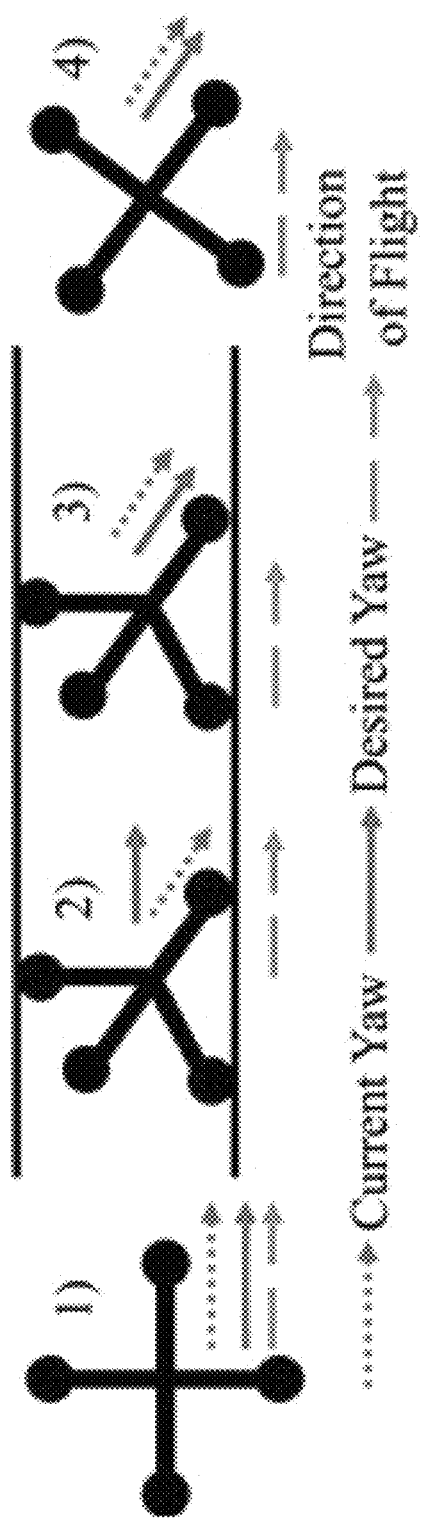
FIG. 6 is a schematic showing adjustment of yaw for the quadrotor system of FIG. 1.

In this section, an admittance controller 260 in yaw to account for the physical forces acting on the quadrotor 100 in relatively smaller gaps and tunnels is disclosed. It is critical to replan the yaw setpoint because as the quadrotor 100 approaches the passageway, unforeseen interactions can lead to unintended yaw moments. In such scenarios, if the yaw set-point is not updated, the quadrotor 100 tries to correct the yaw repeatedly during its flight and is prone to multiple collisions which may lead to unsuccessful flights. To this end, the yaw admittance controller 260 is included, where an outer loop is added to the low level controller 210 to modify the yaw reference trajectory. FIG. 6 demonstrates a scenario where a multi-copter flies through a constrained space. Upon entering, the vehicle experiences interactions and the current yaw changes. At this instance, the vehicle would try to reject the interaction which could result a jerky motion. Therefore, an admittance controller 260 is implemented to update the desired yaw according to the current yaw and comply with the interactions. The complete control structure is showed in FIG. 7. The control in Equation (8) is used to generate a new desired yaw:

$$M_\psi \ddot{\psi}_d + D_\psi \dot{\psi}_d + K_\psi \psi_d = \psi, \tag{8}$$

where $\psi$ is the current yaw. The tuning parameters of $M_\psi$, $D_\psi$ and $K_\psi$ are chosen such that the dynamics of $\psi_d$ is critically damped to track changes in current yaw, to avoid delayed responses and oscillations in $\Omega_d$ from over-damped and under-damped dynamics, respectively.

Experiments and Discussions

This section demonstrates the performance of the disclosed quadcopter 100 through experiments of i) flying through a gap and ii) flying through a passageway.

Hardware Setup

Experiments were conducted in an indoor drone studio at the Arizona State University. An Optitrack motion capture system with 17 high-speed cameras was utilized to obtain the position and heading of the vehicle. The 3-D position and current heading were transmitted to PIXHAWK, at 120 Hz for real-time feedback control. A high-level onboard computer 200 implementing was an Intel UP-board which ran the Robot Operating System (ROS) for communication with motion-capture system. A multi-threaded application was implemented for the admittance controller 260 and to enable the serial communication with the PIXHAWK. The quadrotor 100 was equipped with two additional IMUs, one underneath each arm, to obtain the arm bending angle.

The low-level attitude control algorithm 210 was implemented as described herein. A quaternion-based complementary filter was implemented for attitude estimation. A Kalman filter based algorithm was implemented for the low-level position estimation, and a cascaded P-PID control structure for the position control module. The admittance parameters ($M_\psi$, $D_\psi$, $K_\psi$) were (0.01, 0.2, 1.0) for both the flight tests.

Flight Through a Gap

Figure 9D:
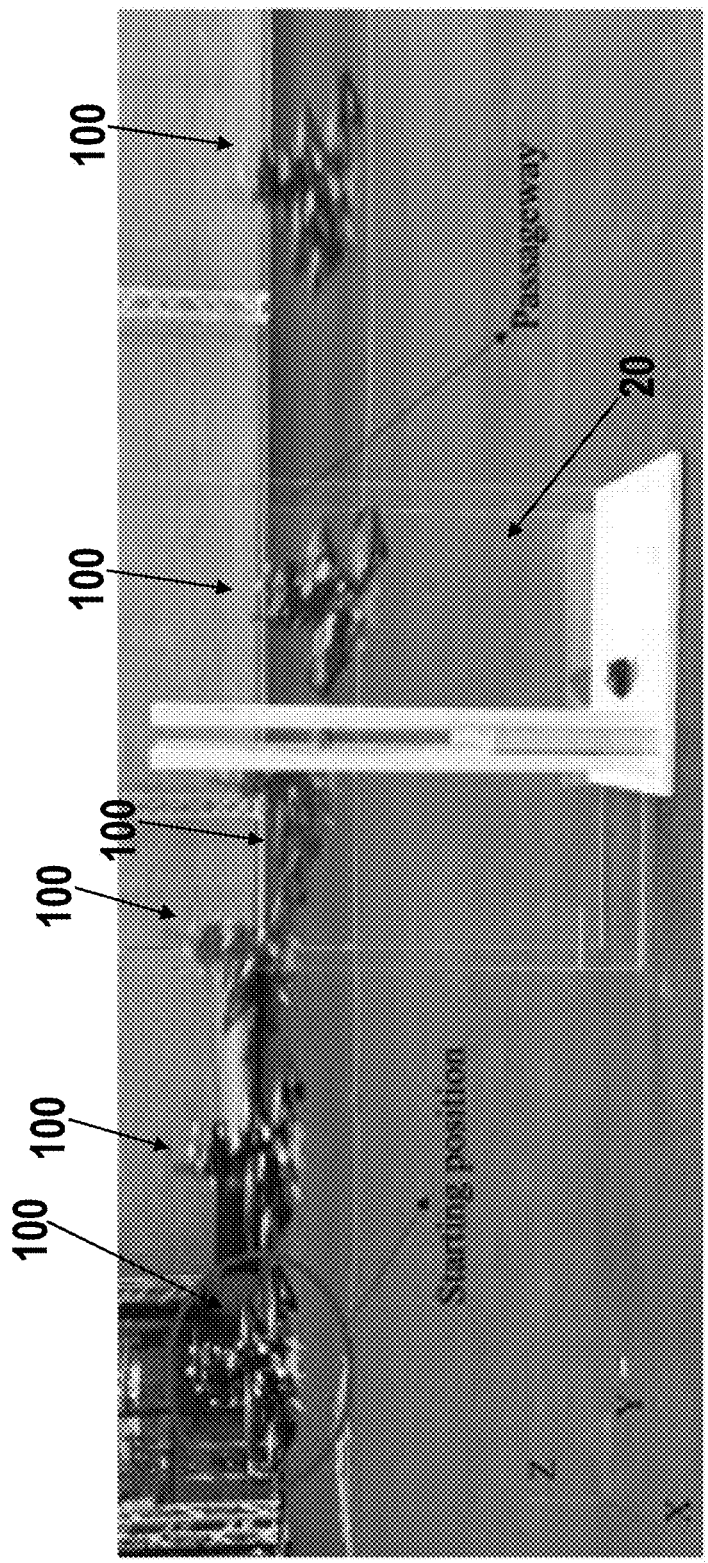
FIG. 9D is a composite photograph showing the quadrotor system of FIG. 1 flying through a passageway.
Figure 10A:
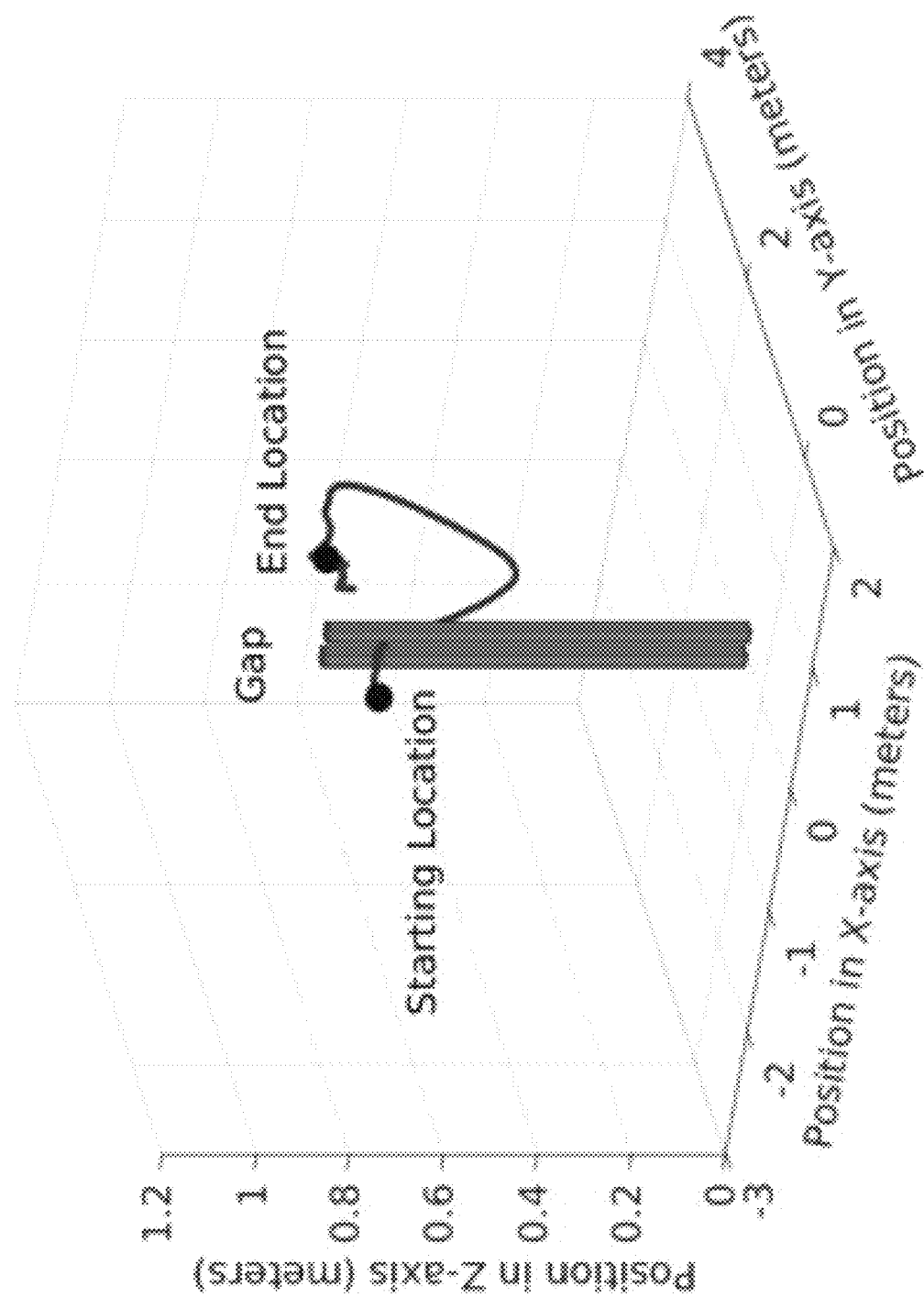
FIG. 10A is a graphical representation showing a 3-D trajectory of the quadrotor system of FIG. 1 traveling through a narrow gap.
Figure 10B:
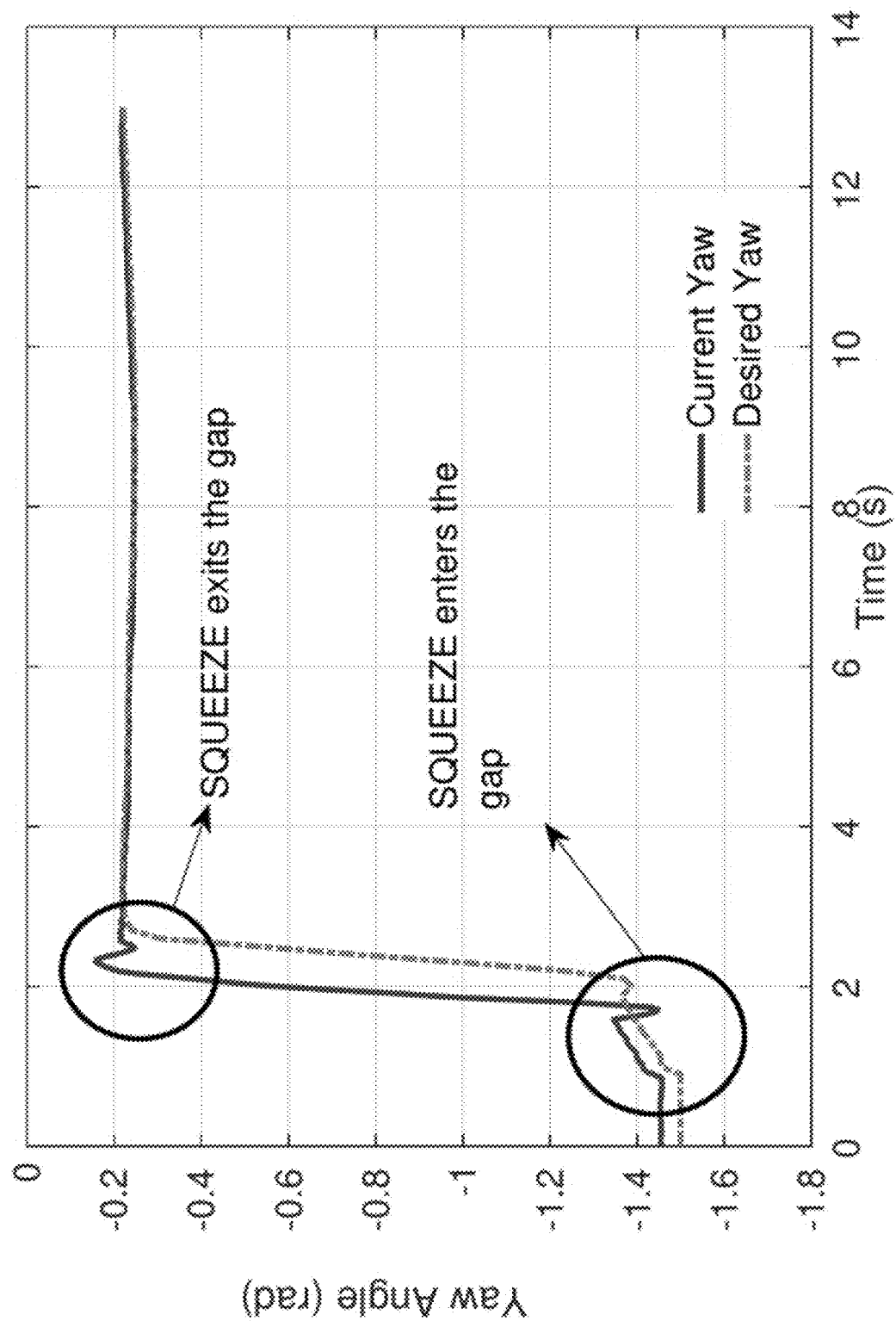
FIG. 10B is a graphical representation showing results of a flight through a 0.39 m×0.04 m gap compared with a desired yaw angle reference trajectory.

In a first flight test shown in FIG. 9A, the quadrotor 100 autonomously flew through a gap. The gap was a pair of wooden beams 10, 90 cm tall, attached to a fixed base plate as shown in FIG. 9A. The two wooden beams 10 were 30 cm apart, which was less than the width of the quadrotor 100 (41 cm) as measured from the tip of one propeller guard 132 to the tip of the diametrically opposite propeller guard 132. The base of the gap was located at (0, 0.5, 0) and the tip's location was (0, 0.5, The quadrotor 100 started at location (0, 0, 0.8) and the target location was (0, 1.5, FIG. 10A shows the trajectory of the quadrotor 100 during flight. The interaction between the quadrotor 100 and the gap lasts for about 0.8 seconds. It can be observed that, this interaction resulted in a loss of height by approximately 30 cm as well as a change in the heading (yaw) of the quadrotor 100. The quadrotor 100 complied with the change in heading using the admittance controller 260 as described herein. FIG. 10B demonstrates the current yaw and desired yaw of the quadrotor 100 while in admittance mode. After the quadrotor 100 entered the gap, the current yaw of the quadrotor 100 changed due to interaction with the wooden beams 10. The admittance controller 260 changed the yaw setpoint to comply with these interactions. After the quadrotor 100 exited the gap, it returned to the height setpoint while maintaining the desired yaw generated by the admittance control 260.

Flight through a Passageway

Figure 11A:
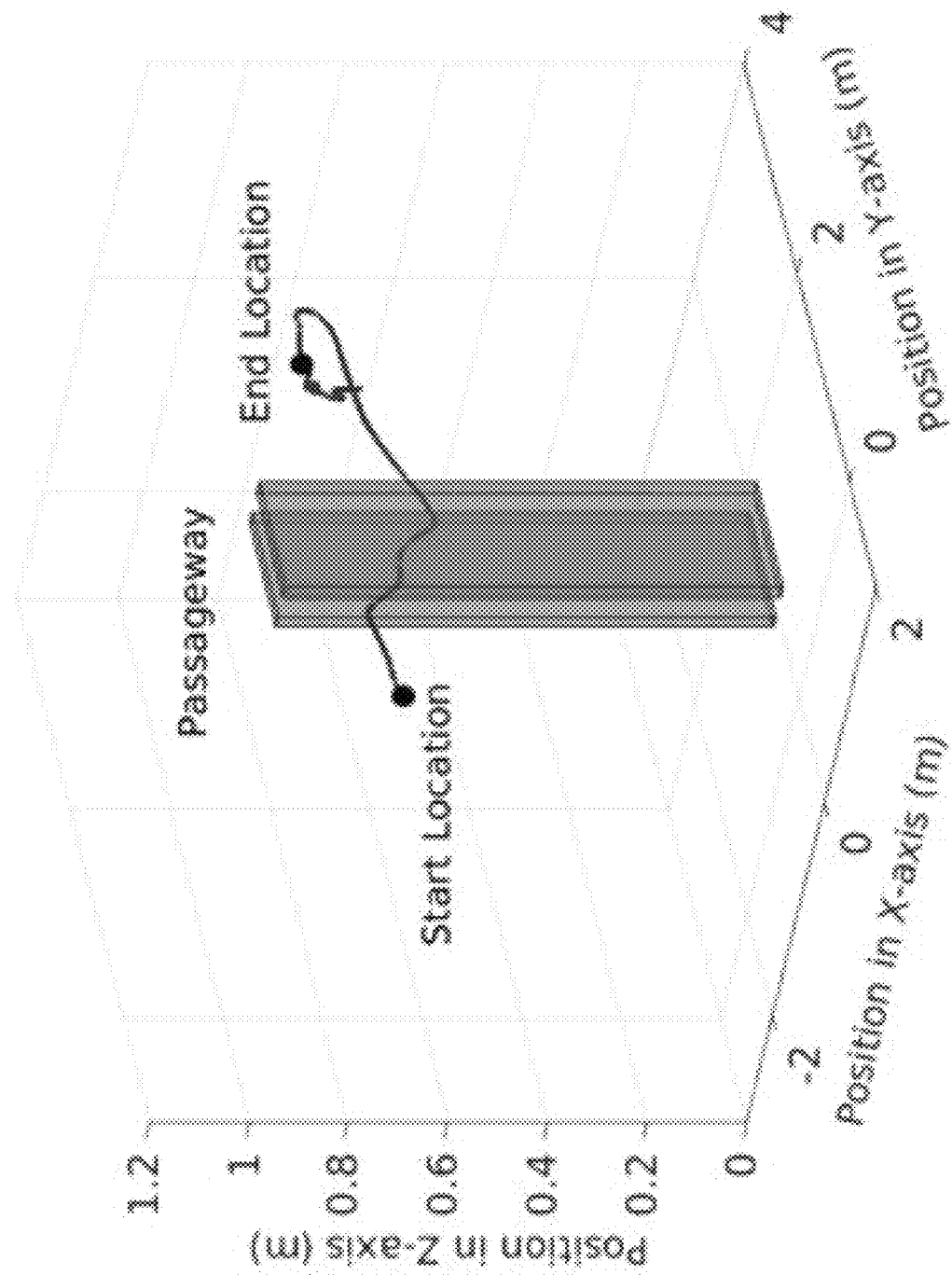
FIG. 11A is a graphical representation showing a 3-D trajectory of the quadrotor system of FIG. 1 traveling through a channel.
Figure 11B:
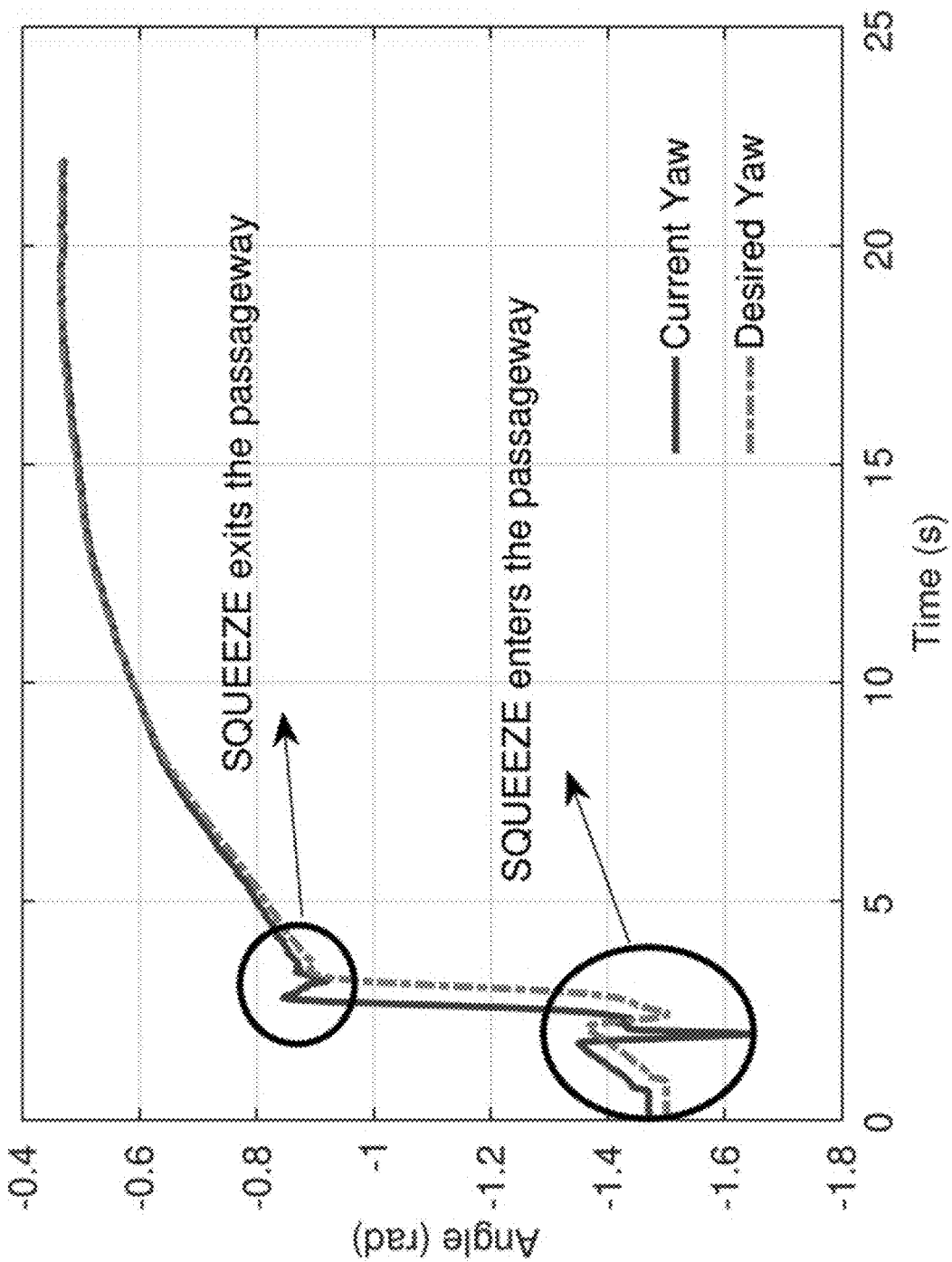
FIG. 11B is a graphical representation showing results of a flight through a channel compared with a desired yaw angle reference trajectory of the quadrotor system of FIG. 1.

After successfully evaluating flight through a gap, the performance of the quadrotor 100 is evaluated using a passageway 20 where the vehicle continuously interacts with the environment. For the experimental setup, two acrylic sheets of 1 meter length are utilized to create the passageway with a width of 29 cm. FIG. 9B shows the video snapshots of the quadrotor 100 flying through the passageway 20. The quadrotor 100 remains in the passageway for 1 second. The quadrotor 100 started at (0, 0, 0.8) and the targeted location was (0, 3.0, 0.8). The beginning of the passageway 20 is located at 80 cm from the origin along the y-axis. While successfully flying through the passageway 20, the quadrotor 100 lost height by 15 cm. The loss in height can be attributed to potential near-wall aerodynamic effects and physical interactions with the walls of the passageway 20. As shown in FIG. 6 and explained herein, an admittance control 260 was implemented to change the desired yaw and comply with the interactions. FIG. 11B represents the yaw admittance of the quadrotor 100 under interactions. As the quadrotor 100 enters the narrow passageway 20, the desired yaw changes according to the current yaw, which is the expected behavior of admittance control 260. FIGS. 8A-8D sequentially depict the arms 104A-D morphing and adapting to the narrow passageway 20, while flying through it.

In this disclosure a novel quadrotor 100 with a passive folding mechanism which is capable of flying through gaps and passageways with dimensions smaller than its full body width while interacting with the environment. An adaptive controller 210 is included for trajectory tracking as well as a yaw admittance controller 260 in the outer loop to account for physical interactions during the flights. The mechanical complexity and added weight of the quadrotor 100 was low compared to existing morphing quadrotors. Finally, the quadrotor 100 was validated in flight tests through narrow apertures and tunnel-like environments.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method of operating a quadrotor with a variable geometry shape configuration via passive morphing, comprising:
    providing a quadrotor comprising a body frame including a base and a top plate, the body frame including a plurality of arms, each arm of the plurality of arms including:
        a propeller driven by at least one motor, a portion of the arm mounted over a connection member defining a hinge extending between the base and the top plate accommodating an in-plane rotary motion of the arm along a plane defined by the hinge, and
        a torsional spring attached to the hinge; and
    deploying the quadrotor along an environment defining an obstruction including:
        deflecting the torsional spring thereby engaging in-plane rotary motion of the arm away from an original position as the arm engages the obstruction, and
        urging the arm back to the original position by an angular return force from the torsional spring.

2. The method of operating the quadrotor of claim 1, wherein adjacent motors and propellers associated with each arm of the plurality of arms are staggered at different heights, preventing physical interference between arms of the plurality of arms when the arms contact the obstruction and rotate.

3. The method of operating the quadrotor of claim 1, wherein the torsional spring of the arm is positioned between the arm and the top plate, a first end of the torsional spring being secured to the top plate, and a second end of the torsional spring opposite the first end being secured to the portion of the arm.

4. The method of operating the quadrotor of claim 1, further comprising a computer on board the body frame configured to execute a controller that operates each motor of a plurality of motors that drive a respective propeller positioned along each of the plurality of arms.

5. The method of operating the quadrotor of claim 4, wherein the computer is configured to execute a yaw admittance controller that adds an outer loop to a low level controller to modify a yaw reference trajectory to adjust for changes in yaw as the plurality of arms interact with the obstruction.

6. The method of operating the quadrotor of claim 4, wherein the computer is in communication with one or more sensors configured to determine a position and a moment of inertia of each arm of the plurality of arms of the quadrotor.

7. The method of operating the quadrotor of claim 4, wherein the computer executing the controller is configured to determine a compensatory action for the propeller as the arm is passively rotated.

8. A quadrotor, comprising:
    a body frame; and
    a plurality of arms, each arm of the plurality of arms including:
        a propeller driven by at least one motor,
        a portion of the arm mounted along a joint defined along the body frame and accommodating in-plane rotary motion of the arm to passively change position of the arm for navigating along an obstruction, and
        a torsional spring positioned along the joint, the torsional spring being tensioned as the arm is passively rotated about the joint and releasing as the arm clears the obstruction such that the arm returns to a neutral position.

9. The quadrotor of claim 8, wherein the quadrotor further comprises a computing system that is configured to issue instructions to operate the at least one motor.

10. The quadrotor of claim 9, wherein the computing system is in communication with one or more sensors that determine a position and a moment of inertia of each arm of the plurality of arms.

11. The quadrotor of claim 9, wherein the computing system is configured to determine a compensatory action for the propeller based on an altered configuration of the plurality of arms as one or more of the arms are passively rotated to navigate around the obstruction.

12. The quadrotor of claim 8, further comprising a propeller guard positioned over the propeller.

13. The quadrotor of claim 12, wherein the body frame and the propeller guard are three-dimensional printed using a polymer.

14. The quadrotor of claim 13, wherein the polymer is polylactide.

15. The quadrotor of claim 8, wherein the plurality of arms are staggered in height to reduce physical interference between arms of the plurality of arms when the arms contact the obstruction and rotate.

16. The quadrotor of claim 8, wherein the joint is defined by an engagement between the portion of the arm and a connection member extending between a base and a top plate of the body frame.

17. A method of operating a quadrotor, comprising:
- providing a quadrotor comprising a vehicle frame which adapts to tight spaces by physically interacting with obstructions or obstacles within the space, the quadrotor including a plurality of arms configured for passive morphing; and
- navigating the quadrotor along an obstruction in an environment via the passive morphing, including:
  - engaging the obstruction by the quadrotor by passively rotating at least one arm of the plurality of arms about a hinge in response to the arm contacting the obstruction.

18. The method of claim 17, wherein a portion of the plurality of arms includes one or more propellor guards located at an end of each of the plurality of arms that contact the obstruction and act as bumpers forcing an associated arm to rotate about a respective joint resulting in the passive morphing providing stability to the quadrotor during physical interactions with the environment.

19. The method of claim 17, wherein the quadrotor includes at least one torsional spring that deflects to accommodate in-plane rotary motion of the at least one arm away from an original position as the arm engages the obstruction and provides an angular return force to urge the arm back to the original position.

20. The method of claim 19, wherein the at least one torsional spring is positioned along the hinge.

\* \* \* \* \*